(12) United States Patent
Miklos et al.

(10) Patent No.: US 7,783,077 B2
(45) Date of Patent: Aug. 24, 2010

(54) EYE GAZE TRACKER SYSTEM AND METHOD

(75) Inventors: Luke B. Miklos, St. Peters, MO (US); Eric C. Fesenmaier, St. Charles, MO (US); Kevin J. Steyer, Florissant, MO (US)

(73) Assignee: The Boeing Company, Chicago, IL (US)

( * ) Notice: Subject to any disclaimer, the term of this patent is extended or adjusted under 35 U.S.C. 154(b) by 935 days.

(21) Appl. No.: 11/565,886

(22) Filed: Dec. 1, 2006

(65) Prior Publication Data

US 2008/0130950 A1 Jun. 5, 2008

(51) Int. Cl.
G06K 9/00 (2006.01)
A61B 3/14 (2006.01)

(52) U.S. Cl. .............. 382/103; 382/209; 351/209

(58) Field of Classification Search .......... 382/100, 382/103, 104, 106, 107, 115, 117, 118, 123, 382/168, 173, 181, 199, 203, 209, 232, 255, 382/257, 274, 276, 286, 291, 305, 312; 701/49; 351/209; 345/7, 8; 434/44

See application file for complete search history.

(56) References Cited

U.S. PATENT DOCUMENTS

| 5,487,665 A | 1/1996 | Lechner |
| 5,746,599 A | 5/1998 | Lechner |
| 5,927,985 A * | 7/1999 | Lechner ................. 434/44 |
| 6,190,172 B1 * | 2/2001 | Lechner ................. 434/44 |
| 6,578,962 B1 * | 6/2003 | Amir et al. ............. 351/209 |
| 6,943,754 B2 * | 9/2005 | Aughey et al. ........... 345/8 |
| 7,199,767 B2 * | 4/2007 | Spero ................... 345/7 |
| 7,460,940 B2 * | 12/2008 | Larsson et al. ........... 701/49 |

* cited by examiner

*Primary Examiner*—Seyed Azarian
(74) *Attorney, Agent, or Firm*—Klintworth & Rozenblat IP LLC

(57) ABSTRACT

The invention relates to systems and methods for tracking the movement of an operator's eyes in order to determine the real-time gaze angle of the eyes of the operator. In one embodiment, the invention may utilize an eye camera and a processing device. A frame by frame image of the eye may be captured utilizing the camera and the processing device, and a custom template resembling the operator's eye may be created utilizing the image produced by the eye camera. The custom template may be substantially the shape and size of the pupil of the eye of the operator, or may also represent additional features of the eye of the operator, such as the iris, sclera, cornea, or eye-lids. A tracking algorithm may determine a substantially real-time gaze angle of the eye.

31 Claims, 4 Drawing Sheets

EYE GAZE TRACKER SYSTEM AND METHOD

BACKGROUND OF THE INVENTION

There are a variety of methods and systems that have been used in the past in an attempt to track the movement of an operator's eyes in order to determine the eye gaze of the operator so that it may be known where the operator is looking. Some of these methods and systems have attempted to measure the operator's eye gaze by attempting to measure both the operator's head position and orientation, and the operator's eye position. However, many of these methods and systems suffer from one or more problems such as: inaccuracy; timely; not being in real-time; difficulty in administering; costly; unstable; inconsistency; and/or experience various different types of problems.

A method and system is needed for determining an operator's real-time eye gaze while simultaneously reducing or eliminating one or more problems of the prior art.

SUMMARY OF THE INVENTION

In one aspect of the present invention, a method for tracking movement of an eye of an operator is provided. In one step, an eye camera and a processing device are provided. In another step, a frame by frame image of the eye is captured utilizing the camera and the processing device. In another step, a custom template of the eye is created utilizing the eye camera. The custom template resembles at least a portion of the eye of the operator. In another step, a tracking algorithm is utilized to determine a substantially real-time gaze angle of the eye. The tracking algorithm utilizes data pertaining to both the frame by frame image of the eye and to the custom template.

In another aspect of the present invention, another method for tracking movement of an eye of an operator is provided. In one step, a head tracking device, an eye camera, and a processing device are provided. In another step, a frame by frame image of the eye is captured utilizing the camera and the processing device. In another step, a focal point of the eye is determined relative to the head tracking device. In yet another step, the operator is required to look at a plurality of calibration points. The calibration points are each displayed at gazes which are determined utilizing pre-determined gaze angles for each of the calibration points, and the determined focal point. In another step, a position of a portion of the eye of the operator is determined at each of the calibration points.

In a further aspect of the present invention, yet another method for tracking movement of an eye of an operator is provided. In one step, an eye camera, and a plurality of processing devices are provided. In another step, a frame by frame image of the eye is captured utilizing the camera and at least one of the processing devices. In still another step, a tracking algorithm is utilized to determine a location of a portion of the eye. The tracking algorithm does a correlation calculation at a low resolution of the eye image to determine an approximate location of the portion of the eye. Additionally, the tracking algorithm does multiple correlation calculations at a high resolution of the eye image by splitting the high resolution eye image into multiple pieces and having parallel correlation calculations of each of the multiple pieces conducted by the processing devices. The tracking algorithm determines the location of the portion of the eye in the frame by frame eye image utilizing the low and high resolution correlation calculations.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Figure 1:
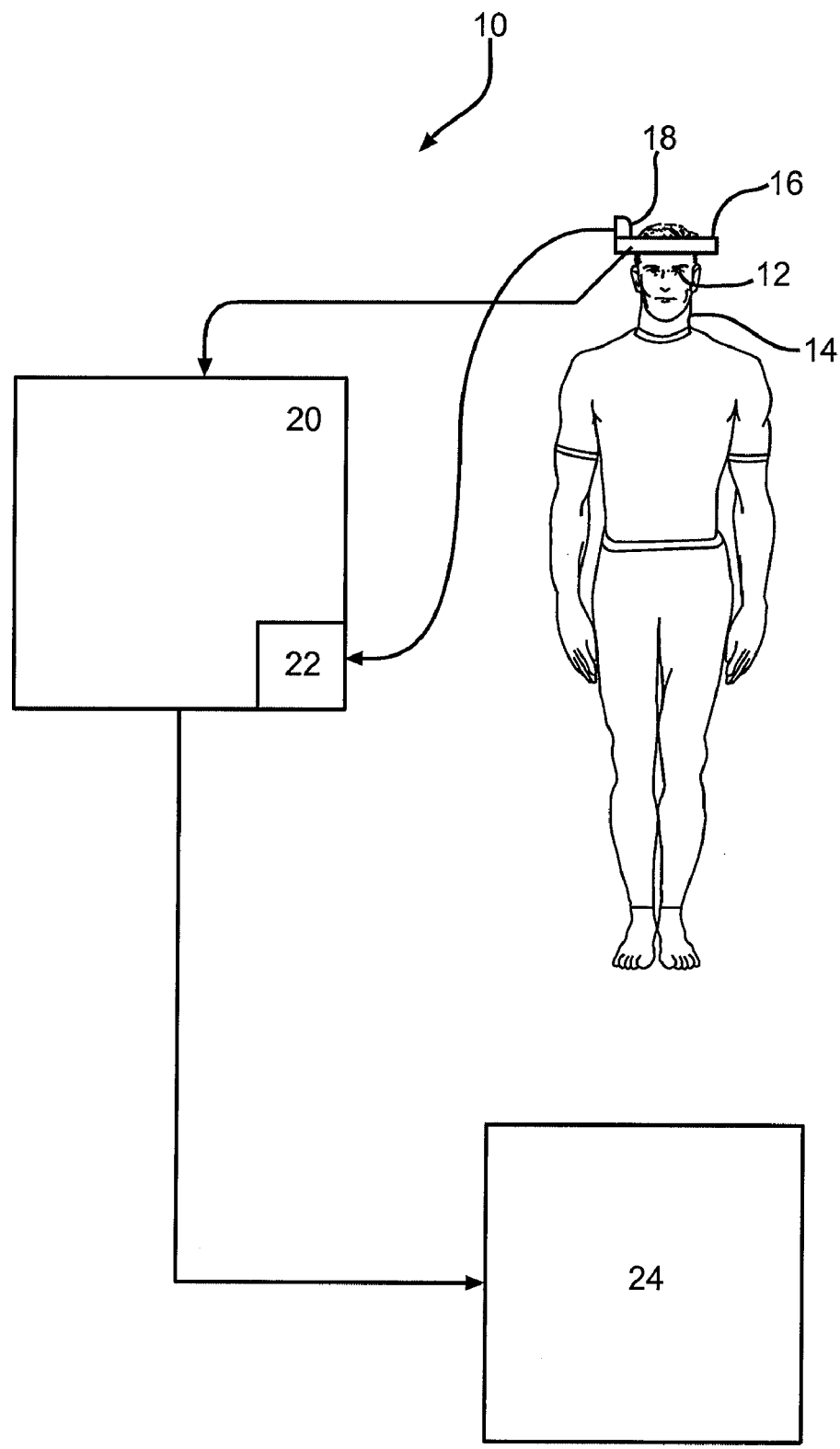
FIG. 1 is a system under one embodiment of the invention which may be utilized to track movement of an operator's eyes.

FIG. 1 depicts a system 10 which may be used in one embodiment of the invention to track movement of one or more eyes 12 of an operator (or user) 14 of the system 10. It should be noted that throughout the application, that the terms 'eye' or 'eyes' may each be used to represent both plural and singular connotations. The system 10 may comprise a head tracking device 16, an eye camera, 18, one or more processing computers 20, a real-time frame capture card 22, and external systems 24.

The head tracking device 16 may comprise any type of device which is adapted to track the movement of an operator's head. The head tracking device 16 may have sensors which are head-mounted to the operator utilizing a helmet, strap, or other attachment device. In other embodiments, a non-head-mounted tracking device may be utilized which may track movement of the head visually, thermally, or through other mechanisms. The head tracking device 16 may utilize magnetic tracking, acoustical tracking, laser tracking, or other type of tracking mechanism which provides real-time sensory data that describes the position and orientation of the operator's head in three-dimensional space. Typical interfaces with the head tracking device 16 may comprise Ethernet messages, serial messages, or other PC interface that allows the software to receive the head position and orientation data. The head tracking device 16 may be statically linked with the eye camera 18 so that if the head tracking device 16 changes position, both the head sensors and the eye camera may move in unison. In other embodiments, the head tracking device 16 may not be statically linked with the eye camera 18. The head tracking device 16 may be setup and calibrated so that its reference point in three dimensional space is the same as the rest of the system 10, which may have a specific reference point in order to display calibration points correctly. The head tracking device 16 may provide real-time data regarding the position and orientation of the operator's head to the software in the processing computer (PC) 20.

The eye camera 18 may comprise any type of camera which is adapted to take pictures of the operator's eye 12. In one embodiment, a miniature camera may be mounted on a head-mounted apparatus, but in other embodiments, the camera may be non-head-mounted. For instance, in another embodiment, the eye camera 18 may utilize a lens along with fiber optic cables to channel the eye visual to an off-head camera which may or may not be statically linked to the head tracking device 16. Regardless of what type of camera 18 is utilized, the camera 18 may provide streaming, frame by frame, real-time images of one or more of the operator's eyes to the software in the processing computer 20. The camera may include an infra-red LED (or spotlight) which may be pointed, reflected, or refracted at the operator's eyes. In other embodiments, an infra-red LED may be attached to or apart from the camera, or a non-infra-red device may be utilized. Preferably, the LED is mounted in or along the camera 18 so that its illumination follows substantially the same vector that the camera's viewport (line of sight) does. The LED may provide a glint in the eye image that the software in the processing computer 20 tracks and/or utilizes for its various tracking stability features. The "glint" may comprise a twinkle in the operator's eye, which is a spot in the operator's eye that light directly reflects off of a specular reflection. In one embodiment, an infra-red filter may be placed across the lens of the camera 18 in order to provide substantially noise-free eye frames and thus substantially stable tracking. In other embodiments, different types of setups may be utilized.

The one or more processing computers 20 may comprise a multi-processor machine, or multiple computers each having their own processors. In one embodiment, the tracking software run on the processing computers 20 may utilize a plurality of processors with multiple threads (i.e. parallel processing). The software may be built for Windows, Linux, or other types of devices. The software may comprise Boeing VIDS 20/20 Gaze Tracker software, which may also be referred to as the Boeing Video Object or the Boeing AOI Tracker. In other embodiments, varying types of software may be utilized. The processing computers 20 may have available PCI slots for a real-time frame capture card 22, which may comprise a PCI card with a composite video input which captures the frame by frame images of the camera 18. The PCI frame capture card 22 may utilize any other type of video input, and/or whatever is necessary to interface with the eye camera. In other embodiments, the frame capture card 22 may utilize any other type of interface with the processing device, and need not necessarily be a PCI card. An example of a video interface that the real-time frame capture card 22 supports may be a RS-170 video signal. A single channel input card may be utilized. In other embodiments, any type of card 22 having multi or single channels may be utilized to provide real-time frame by frame capture of the images provided by the camera 18. The card 22 may not have a TV-tuner or mpeg encoder, but rather may fill a double memory buffer with the image data as the camera provides it and then may notify the PC upon the completion of each frame with an interrupt. In such manner, frame by frame images taken by the camera may be saved onto the PC.

The external systems 24 may comprise various computing and/or visual components that may respond to the outputs of the tracking software. The external systems 24 may be adapted to interpret calibration point requests and visually display calibration points at the requested locations in three-dimensional space. Single or multiple screen display devices may be utilized to visually display the calibration points. The external systems 24 may share the same reference point as the system 10 in order to display the calibration points correctly. The external systems 24 may comprise a device, display, system, or other type of machine or processor which is adapted to utilize the outputted gaze of the tracking software, such as by displaying extra visual information at the operator's gaze on a screen in high resolution. In other embodiments, the external systems 24 may utilize the outputted gaze of the tracking software in various manners. In still other embodiments, the tracking software may run on the external system 24.

Figure 2:
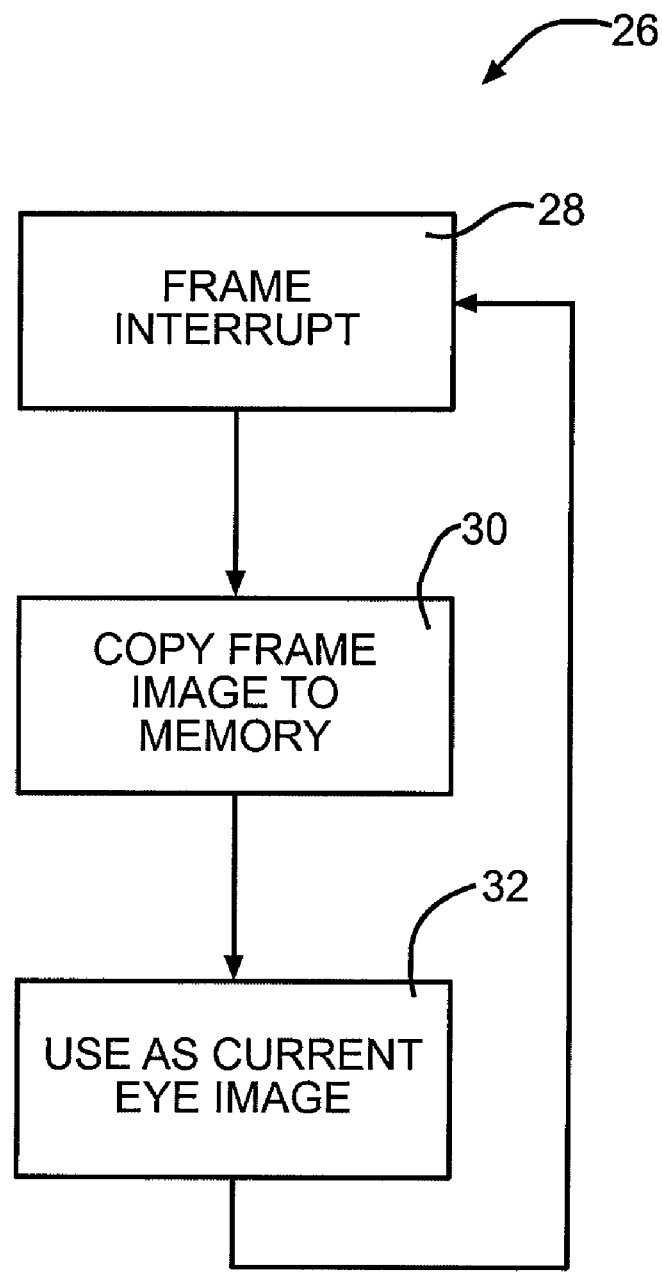
FIG. 2 is a flow-chart of a method under one embodiment of the invention for acquiring frame by frame imagery of the operator's eye.

FIG. 2 depicts a flow chart 26 under one embodiment of the invention for frame-by-frame imagery of the operator's eye which is taken by the camera 18 and downloaded to the processing computers 20 utilizing the real-time frame capture card 22. As shown, after the camera 18 shoots a frame image of the operator's eye at a real point in time, a frame interrupt 28 may occur due to the real-time frame capture card 22. The processing computer(s) 20 may respond to the frame interrupt 28, and copy the frame image 30 at that point in time into the processor's memory. The real-time frame image 30 may then be used as the current eye image 32 until the next frame interrupt 28 occurs. In such manner, frame by frame images of the operator's eye may be taken, saved in the processing computer 20, and used by the tracking software in order to track the position and orientation of the operator's eye in real-time. The frame-by-frame imagery shown by the flow chart of FIG. 2 may occur throughout the duration of both the calibrating mode shown in FIG. 3, and the tracking run-time mode shown in FIG. 4.

Figure 3:
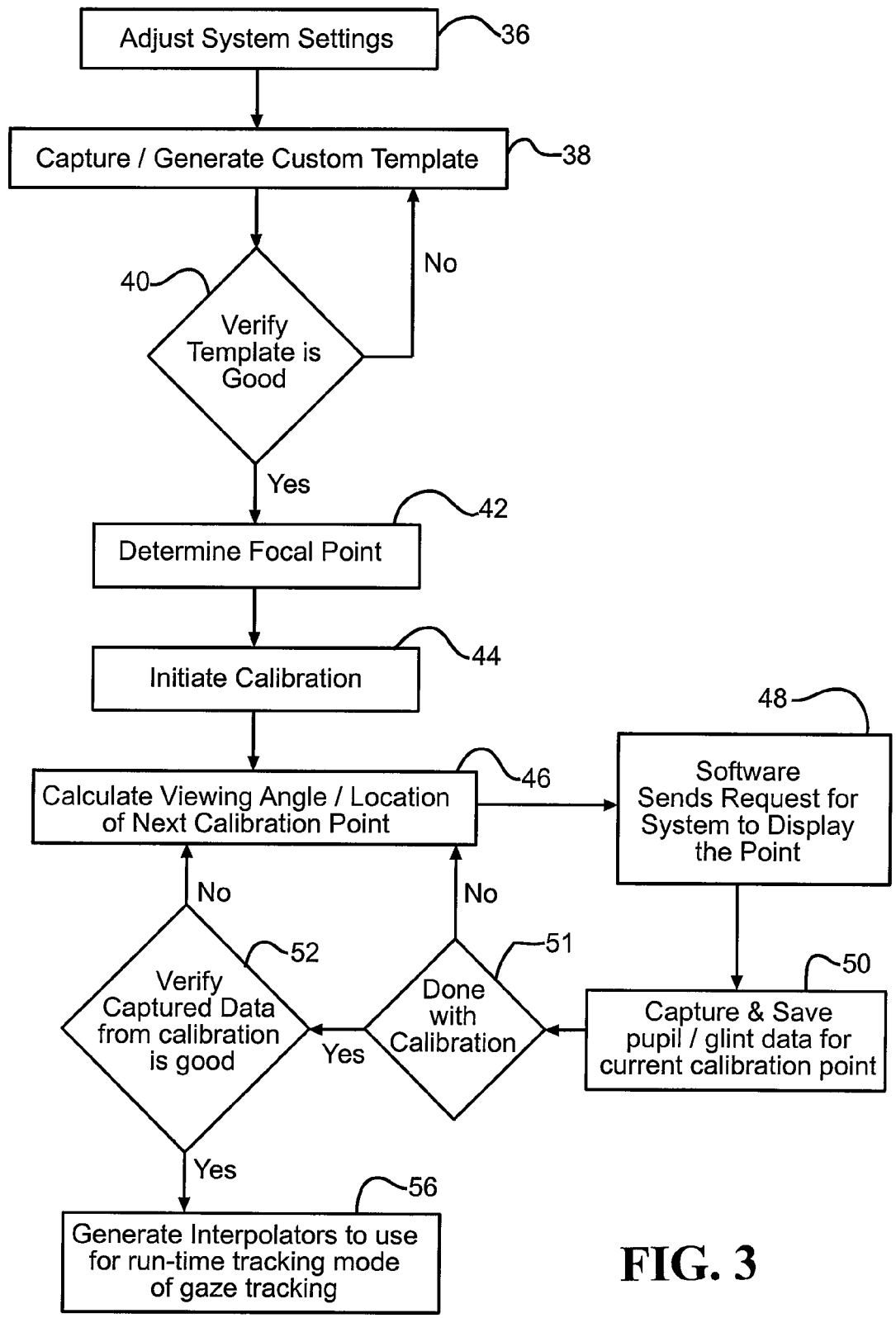
FIG. 3 is a flow-chart of a method under one embodiment of the invention for calibration of a system under the invention for tracking eye movement of an operator.

FIG. 3 depicts a flow chart 34 demonstrating one embodiment under the invention of a calibrating mode for calibrating the system 10. In step 36, the settings of the system 10 may be adjusted. The head-tracking device 16 may be placed on or about the operator and begin tracking head movement of the operator, the eye camera 18 may begin taking frame by frame images of the operator's eyes, and the processor 20 may begin recording frame by frame images, positions, and/or orientations of the operator's head and eyes. The operator may view a display screen and adjust video settings on the screen such as brightness, contract, tracking thresholds, etc. in order to obtain maximum data dispersion inside the frame capture card's analog to digital conversion range. For instance, the operator may adjust the settings to that the darkest part of a displayed image has the minimum possible illumination value, while the brightest part of the displayed image has the maximum possible illumination value. The tracking software may provide visual feedback to the operator to assist the operator with these settings. For instance, histograms and/or various pixel counts of data that fall above or below thresholds may be provided to the operator. The system 10 may also contain automatic setting adjustments in order to aide the operator in adjusting the system 10.

In step 38, a custom template representing some aspect of the operator's eye, the pupil and/or the iris for example, may be captured utilizing the eye camera 18. The custom template may comprise an image, which resembles the area of the operator's eye that the software is trying to track. For instance, in one embodiment, the custom template may substantially comprise an image of substantially the same shape, size, and/or proportion of the portion of the operator's eye that the software is attempting to track. In another embodiment, the custom template may also represent additional features of the eye of the operator, such as the iris, sclera, cornea, retina, or eye-lids. The template may be formed utilizing a variety of image processing techniques on the frame-by-frame images taken by the eye camera 18. For instance, in one embodiment, the eye-camera may be infra-red, and the custom template may be created using a dark area in the infrared frame by frame image which may resemble a portion of the eye, such as the pupil. In other embodiments, the custom template may be formed utilizing varying devices, systems, and methods. In such manner, a custom template of the operator's eye may be determined. The custom template may be different for each operator of the system 10, as each operator may have different shaped or sized eyes. The position of the glint in the operator's eye, which may comprise a bright area in or close to the operator's pupil, may be determined for later use, during formation of the custom template. However, the custom template is generated independently of the operator's eye glint.

In step 40, a template check may be used to determine if the template is bad based on improper sizes and/or shapes. The template check may be done automatically by the software, manually by the operator, and/or may comprise a combination of these checks. If the template check determines that the template is incorrect, step 38 may be repeated. Otherwise, the software proceeds onto step 42.

In step 42, the focal point of the operator's eye, comprising an X, Y, Z three dimensional location in space, may be determined relative to the head tracking device 16. The software may command the external system 24 to display a visual for the operator to align with two reference points between the display and the operator. For instance, the operator may be required to align the tips of two rods, two cross-hairs on a screen, or the corners of an obstructing object. When the operator is looking at the imagery across the two reference points, the software may determine where the focal point of the operator's eyes are because there may only be one location in space that the imagery aligns with the reference points. In other embodiments, various mechanisms may be utilized in order to determine the operator's eye focal point.

In step 44, calibration of the system 10 may be initiated. This calibration may be initiated by the operator commanding the software to initiate calibration. In other embodiments, the system 10 may automatically begin calibration.

In step 46, a calibration point that represents the gaze angles at which the user to is to look at may be used to calculate the location at which the calibration point is to be displayed. A gaze angle may be the angle of sight of the operator's eyes. The location of the gaze at which each calibration point will be displayed may be determined by the software based on a calculation which may take into account the pre-determined gaze angles of that particular calibration point and the location and orientation of the determined operator's eye focal point relative to the head tracking device. The software may calculate the location and orientation of the eye focal point by adding the focal point offset determined in step 42 with the location and orientation data provided by the head tracking device 16. Steps 46, 48, and 50 may be performed for each calibration point in the calibration point pattern. The software may continue to step 52 after it has executed steps 46-50 on each calibration point.

In step 48, the software may send requests to the system 10 asking it to display each calibration point, one at a time, on a display, which may comprise an image that the operator is commanded to look at without moving his or her head. If the user moves his or her head, the current calibration point is recalculated and redisplayed using the new focal point location relative to the head. In step 50, when the operator looks at a particular calibration point, the tracking software, utilizing a tracking algorithm, may calculate the position of various portions of the eye, such as the pupil and the cornea reflection ("glint"), or other portions of the eye, and may save/store this data along with the pre-determined gaze angles at each calibration point for use during interpolation. The software may use this data later in step 56 to construct interpolators or mappings. The software may construct several mappings between various pairs of data. One such mapping may be between the position of the operator's pupil, or other portions of the eye in other embodiments, and the pre-determined gaze angle at which the calibration point was displayed. Another such mapping may be between the position of the operator's pupil, or other portions of the eye in other embodiments, and the position of the operator's glint position in the operator's eye image, as based on the two dimensional frame-by-frame image taken by the camera 18. In such manner, at each calibration point, the software may determine a position of the operator's pupil, or other portions of the eye in other embodiments, in the frame-by-frame two-dimensional eye image, and may also determine a position of the glint of the operator's eye in the frame-by-frame two-dimensional eye image.

In one embodiment, the tracking algorithm software may convert both the custom template and the eye image into a frequency domain, may multiply the conjugate of the custom template by the eye image to produce a resultant image, and may convert the resultant image into the real domain. In other embodiments, the converted resultant image may be normalized. For instance, in some embodiments, the normalized cross-correlation coefficient, or the correlation score may be calculated. The tracking algorithm software may also do a correlation calculation at a low resolution of the eye image to determine an approximate location of a portion of the eye such as a pupil or other portion of the eye. The tracking algorithm software may additionally do multiple correlation calculations at a high resolution of the eye image by splitting the high resolution eye image into multiple pieces and having parallel correlation calculations of each of the multiple pieces conducted by multiple processing devices. In other embodiments, the high resolution correlation calculations may all be done by the same processing device without splitting the eye image into multiple pieces. The tracking software algorithm may determine a most probable location of a portion of the eye, such as the pupil or other eye portion, in the eye image utilizing the low and high resolution correlation calculations. The tracking algorithm software may do one or more of these functions at any stage of FIGS. 2-4. For instance, the tracking algorithm software may be utilized to determine the position of a portion of the operator's eye, such as a pupil or other eye portion, during calibration of the system 10 as shown in FIG. 3, and may later be used to determine the position of a portion of the operator's eye during the real-time run (or tracking) mode of FIG. 4. In other embodiments, the tracking algorithm software may determine a position of a portion of the operator's eye utilizing various other steps.

In step 52, the software may determine if all of the data captured during the calibration (all iterations of step 50) is acceptable. In one embodiment, the software may have the user look again at the first calibration point displayed to determine if the any of the head-mounted devices have shifted position. It may determine if a shift took place if the pupil/glint positions, or other portions of the eye, are different than they were for that calibration point the first time it was displayed. If there was a significant shift, the whole calibration should be discarded, because there is no way to determine when and where the shift took place (because the shift might not be the only cause of error, example: operator blinks). In other embodiments, varying criteria may be utilized in order to determine whether each calibration point is a good or bad calibration point. For instance, the system 10 may allow the operator to visually view the results of the calibration and to redo certain calibration points if desired. In other embodiments, the system 10 may automatically do additional checks on the results of the calibration and automatically redo bad calibration points if certain criteria are not met. For example, a comparison between two calibration points at different elevation angles should yield resultant calculated pupil positions that are at different vertical positions in the frame. If any data does appear erroneous for a particular calibration point or points, the software may jump back to step 48 to redo that point or points. The calibration point may be displayed again and the data for that point may be re-captured. After all erroneous points are redone, the software may continue back to step 52 to verify again. The user may also have the software pass through step 52 again if he wants to adjust the erroneous data himself.

After the data associated with all of the calibration points has been determined to be good, in step 56, the software of the system 10 may generate interpolators from the calibration point data. The interpolators provide mappings or relationships between the positions of a portion of the eye, such as the pupil, relative to the gaze angles at each of the calibration points. In such matter, by generating interpolation data, the interpolators may be able to determine a gaze angle of the eye, based on interpolation, if the software knows a portion of the eye's position, such as the pupil, regardless of whether the eye is looking at a calibration point. In one embodiment, interpolators may be utilized that implement a thin-plate spline math model. These interpolators may be more stable than curve fitting interpolators when the operator looks outside the bounds of the calibrated area (for instance, at an extreme gaze angle).

Figure 4:
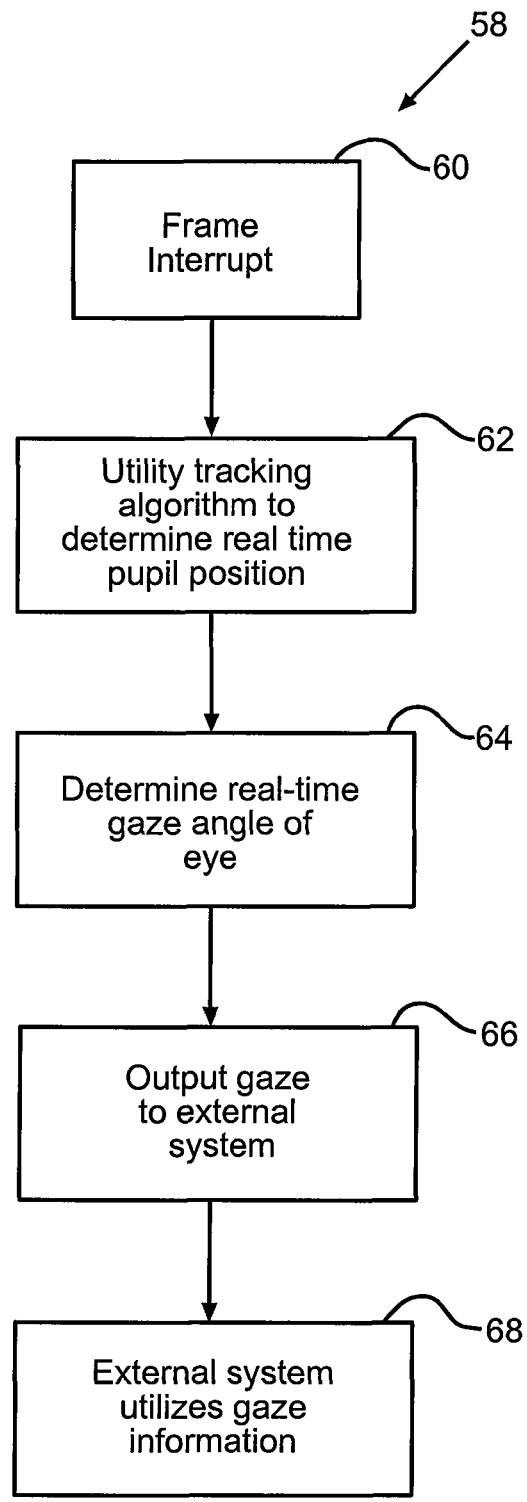
FIG. 4 is a flow-chart of a method under one embodiment of the invention for outputting the real-time gaze angle of an operator's eyes.

After the interpolators are generated from the calibration point data, the software may enter the run-time mode (or tracking mode) as depicted by the flow chart 58 of FIG. 4. At this point in time, the operator may freely move his head and eyes and the system may track the operator's eyes during this movement. In step 60, a frame interrupt may occur signifying to the system 10 to store the image of the operator's eye at that point in time. In step 62, the tracking algorithm of the software may be applied, utilizing the custom template and the eye image at that point in time (or frame), to determine the real-time, two-dimensional position of a portion of the operator's eye, such as a pupil, within the frame image. In step 64, the tracking algorithm software may use the interpolating data of step 56 in order to determine the operator's real-time eye gaze angle at the operator's eye position determined in step 62. In step 66, the tracking algorithm software may output the operator's real-time eye gaze, which is defined as the operator's real-time eye gaze angle and the determined eye focal point, to an external system 24. In step 68, the external system 24 may utilize the real-time location of the operator's eye gaze in order to do some type of activity, such as displaying extra visual information at the operator's gaze on a screen in high resolution. In other embodiments, the external systems 24 may utilize the real-time outputted gaze of the tracking software in various manners.

The methods and systems of the invention may reduce or eliminate one or more problems of one or more eye gaze tracking systems or methods of the prior art. For instance, the custom template and/or tracking algorithm may provide more accurate results in real-time, may be more consistent, may be more stable, may be less difficult to administer, may be less costly, and/or may reduce one or more other problems experienced by one or more of the prior art systems and/or methods.

It should be understood, of course, that the foregoing relates to exemplary embodiments of the invention and that modifications may be made without departing from the spirit and scope of the invention as set forth in the following claims.

We claim:

1. A method for tracking movement of an eye of an operator comprising:

providing an eye camera, and a processing device;

capturing a frame by frame image of said eye utilizing said camera and said processing device;

creating a custom template of said eye utilizing said eye camera, wherein said custom template resembles at least a portion of said eye of said operator, and said custom template comprises at least one of a group comprising a shape, a size, and an illumination of said portion of said eye; and utilizing a tracking algorithm to determine a substantially real-time gaze angle of said eye, wherein said tracking algorithm utilizes data pertaining to both said frame by frame image of said eye and to said custom template.

2. The method of claim 1 further comprising the step of providing a head tracking device.

3. The method of claim 2 further comprising the step of determining a focal point of said eye relative to said head tracking device.

4. The method of claim 1 wherein said custom template resembles at least one of a group comprising the operator's pupil, iris, sclera, eye-lids, retina, and cornea.

5. The method of claim 1 further comprising providing an LED, wherein said eye camera and said LED operate in an infra-red spectrum.

6. The method of claim 1 further comprising the step of providing a real-time frame capture card, wherein said frame capture card is utilized to capture said frame by frame image of said eye.

7. The method of claim 1 wherein said frame by frame image of said eye captures movement of said eye.

8. The method of claim 1 wherein said camera is infra-red, and said custom template is created using a dark area in said infrared frame by frame image.

9. The method of claim 1 wherein said custom template is created utilizing image processing.

10. The method of claim 1 further comprising the step of having the operator look at a plurality of calibration points, wherein said calibration points are at pre-determined gaze angles.

11. The method of claim 10 wherein a gaze at which said calibration points are displayed utilizes said pre-determined gaze angles and a determined focal point of the eye relative to a head tracking device.

12. The method of claim 10 further comprising the step of determining a position of said portion of said eye at each of said calibration points.

13. The method of claim 10 further comprising the steps of determining a position of said portion of said eye at each of said calibration points, and creating interpolators that map between said position of said portion of said eye at each of said calibration points to said pre-determined gaze angles.

14. The method of claim 1 wherein said tracking algorithm converts both the custom template and eye image into a frequency domain, multiplies the conjugate of the custom template by the eye image to produce a resultant image, and converts the resultant image into a real domain.

15. The method of claim 1 wherein said tracking algorithm does a correlation calculation at a low resolution of the eye image to determine an approximate location of said portion of said eye, said tracking algorithm does multiple correlation calculations at a high resolution of the eye image by splitting the high resolution eye image into multiple pieces and having parallel correlation calculations of each of said multiple pieces conducted by multiple processing devices, and said tracking algorithm determines a location of the portion in the eye image utilizing the low and high resolution correlation calculations.

16. The method of claim 1 wherein said tracking algorithm determines said substantially real-time gaze angle of said eye based on a determined real-time position of said portion of said eye.

17. The method of claim 16 wherein said determined substantially real-time gaze angle is outputted to at least one of a group comprising a device, a display, and a system.

18. A method for tracking movement of an eye of an operator comprising:
providing a head tracking device, an eye camera, and a processing device;
capturing a frame by frame image of said eye utilizing said camera and said processing device;
determining a focal point of said eye relative to said head tracking device;
having the operator look at a plurality of calibration points, wherein said calibration points are each displayed at gazes which are determined utilizing pre-determined gaze angles for each of the calibration points, and the determined focal point; and
determining a position of a portion of said eye of said operator at each of said calibration points.

19. The method of claim 18 further comprising the step of creating a custom template of said portion of said eye utilizing said eye camera, wherein said custom template resembles said portion of said eye of said operator.

20. The method of claim 18 further comprising the step of utilizing a tracking algorithm to determine a substantially real-time gaze angle of said eye, wherein said tracking algorithm utilizes data pertaining to both said frame by frame image of said eye and to said custom template.

21. The method of claim 18 wherein said step of determining a focal point of said eye comprises having the operator look at multiple images in order to align the user to a certain position.

22. The method of claim 18 further comprising the step of mapping said position of said portion of said eye into gaze angles and interpolating between known gaze angles of the calibration points.

23. The method of claim 18 wherein a determined substantially real-time gaze angle is outputted to at least one of a group comprising a device, a display, and a system.

24. A method for tracking movement of an eye of an operator comprising:
providing an eye camera, and a plurality of processing devices;
capturing a frame by frame image of said eye utilizing said camera and at least one of said processing devices; and
utilizing a tracking algorithm to determine a location of a portion of said eye, wherein said tracking algorithm does a correlation calculation at a low resolution of the eye image to determine an approximate location of said portion of said eye, said tracking algorithm does multiple correlation calculations at a high resolution of the eye image by splitting the high resolution eye image into multiple pieces and having parallel correlation calculations of each of said multiple pieces conducted by said processing devices, and said tracking algorithm determines said location of said portion of said eye in the frame by frame eye image utilizing the low and high resolution correlation calculations.

25. The method of claim 24 further comprising the step of creating a custom template of said portion of said eye utilizing said eye camera, wherein said custom template resembles said portion of said eye of said operator.

26. The method of claim 25 wherein said step of utilizing a tracking algorithm to determine said location of said eye in said frame by frame eye image utilizes data pertaining to both said frame by frame image of said eye and to said custom template.

27. The method of claim 25 wherein said tracking algorithm converts both the custom template and eye image into a frequency domain, multiplies the conjugate of the custom template by the eye image to produce a resultant image, and inverts the resultant image into a real domain.

28. The method of claim 24 further comprising the step of determining a focal point of said eye relative to a head tracking device.

29. The method of claim 28 further comprising the step of having the operator look at a plurality of calibration points, wherein said calibration points are each displayed during calibration at gazes which are determined utilizing pre-determined gaze angles for each of the calibration points, and the determined focal point.

30. The method of claim 29 further comprising the step of determining a position of said portion of said eye of said operator at each of said calibration points.

31. The method of claim 30 further comprising the step of storing said position of said portion of said eye and said pre-determined gaze angles at each of said calibration points for use during interpolation.

* * * * *